United States Patent [19]

Boerstler et al.

[11] Patent Number: 4,998,792

[45] Date of Patent: Mar. 12, 1991

[54] FIBER OPTIC MODE CONDITIONER

[75] Inventors: David W. Boerstler, Millbrook; Daniel J. Stigliani, Jr., Hopewell Junction, both of N.Y.

[73] Assignee: International Business Machines Corporation, Armonk, N.Y.

[21] Appl. No.: 481,083

[22] Filed: Feb. 16, 1990

[51] Int. Cl.$^5$ .............................. G02B 6/26; G02B 6/42
[52] U.S. Cl. ................................. 350/96.15; 350/96.20
[58] Field of Search ............... 350/96.10, 96.15, 96.20, 350/96.21

[56] References Cited

U.S. PATENT DOCUMENTS

| | | | |
|---|---|---|---|
| 4,053,764 | 10/1977 | Sierak | 250/227 |
| 4,165,496 | 8/1979 | DiDomenico, Jr. et al. | 331/94.5 |
| 4,281,925 | 8/1981 | Forrest et al. | 356/73.1 |
| 4,381,137 | 4/1983 | Berg et al. | 350/96.15 X |
| 4,400,053 | 8/1983 | Kazkaz | 350/96.15 |
| 4,676,584 | 6/1987 | Perlin | 350/96.15 |
| 4,676,594 | 6/1987 | Presby | 350/96.29 |
| 4,687,285 | 8/1987 | Hily et al. | 350/96.18 |
| 4,720,162 | 1/1988 | Mochizuki et al. | 350/96.15 |
| 4,728,169 | 3/1988 | Campbell et al. | 350/96.15 |
| 4,733,932 | 3/1988 | Frenkel et al. | 350/96.20 |
| 4,767,178 | 8/1988 | Sasaki et al. | 350/96.20 |
| 4,768,851 | 9/1988 | Shaw et al. | 350/96.15 |
| 4,798,428 | 1/1989 | Karim et al. | 350/96.18 |

Primary Examiner—Akm Ullah
Attorney, Agent, or Firm—William A. Kinnaman, Jr.

[57] ABSTRACT

A fiber optic mode conditioner for obtaining an equilibrium light distribution in a multimode fiber optic link under test. Light is supplied to the link through a gap between two successive fiber optic segments, followed by a high-curvature region created by wrapping the second fiber optic segment around a mandrel. The gap functions as a mode filter, stripping off all but the lowest modes, while the curved region acts as a mode scrambler redistributing the light energy into the intermediate modes.

20 Claims, 1 Drawing Sheet

FIBER OPTIC MODE CONDITIONER

BACKGROUND OF THE INVENTION

1. Field of the Invention

This invention relates to a fiber optic mode conditioner and, more particularly, to a method and apparatus for achieving an equilibrium light distribution in a multimode optical fiber.

2. Description of Related Art

In recent years, fiber optic links have been used to an increasing extent to replace existing data communication links using copper conductor cables. Among the advantages of fiber optic cables over copper cables are increased information capacity for the same cable size, electrical isolation of the source from the destination, the absence of electromagnetic or RF interference, and improved data security and integrity. Typically, such fiber optic links are used either within a computer system, such as between a host processor and a device control unit and possibly one or more intermediate switches, or in such intersystem uses as telecommunications.

Fiber optic cables are essentially waveguides in which a core is surrounded by a cladding having an index of refraction lower than that of the core. Light energy travelling along a fiber optic conductor thus exhibits propagation modes, in the same general manner as, for example, microwave radiation in metal waveguides. Generally, fiber optic conductors may be classified as either single-mode conductors, in which the energy is confined to a single mode of propagation, or multi-mode conductors in which a fundamental mode as well as higher-order modes are propagated.

The spatial and angular light energy distribution of a multimode fiber varies considerably depending on fiber core diameter, numerical aperture (NA), the length of the fiber and the source launch conditions. Beyond approximately 2 km the light distribution of a typical fiber reaches an equilibrium state known as the equilibrium mode distribution (EMD). This light distribution can be characterized as a 70/70 distribution, meaning 70% of the core is filled and 70% of the angles are present. Once the EMD is achieved the light distribution no longer depends upon the source launch conditions. If the length of the fiber is less than 2 km a significant departure from the EMD can exist, and the light distribution in the fiber will be affected by the source launch conditions.

The amount of loss in a fiber optic link is affected primarily by fiber attenuation and connector loss. Both connector loss and, to a lesser extent, the fiber attenuation are dependent on the light energy distribution in the fiber. Hence, if an EMD does not exist, the source launch conditions may have a strong influence on the link loss. Depending on the link configuration, measurement variability from different sources on the same link may be as high as 3-4 dB.

In general, prior-art methods of achieving an equilibrium mode distribution (EMD) on an optical fiber do so by starting with an optical signal containing a large order of modes (approximately 900 modes for a 62.5-micron fiber) and using suitable mode-filtering techniques to remove all but the strongly guided modes (approximately 225). Thus, the Electronic Industries Association (EIA) recommends a procedure (FOTP-50) which is supposed to remove the source dependence of these link measurements. The procedure requires the source jumper to be wrapped a number of turns (typically 3 to 5) around a mandrel which does not stress the cable (typically 16 to 25 mm in diameter). This method improves the results only slightly. Although wrapping more turns around a smaller mandrel diameter may improve the result by stripping more modes, the minimum-cable-bend-radius specification must be violated to make any appreciable difference. Using eight turns around a 6-mm diameter mandrel still leaves an unacceptable 1.7 dB of variability in lab measurements.

The EIA alternatively recommends using either an adjustable launch condition with an adjustable length of fiber (typically 500-1000 m) spliced onto the test fiber for mode equalization, or a sophisticated beam optics approach that requires the use of an optical bench with a variety of lenses, apertures, filters and special light sources. These techniques are not well suited for field measurements.

Still another technique involves the use of a special 200/250-micron fiber as a mode scrambler/stripper. Although this technique does not produce an EMD, it yields excellent results when used for removing source dependence. However, the fiber is not standard and has limited availability because of its nonstandard size.

SUMMARY OF THE INVENTION

In general, our invention contemplates a method and apparatus for conditioning the mode distribution of an optical signal in a fiber optic conductor in which the optical signal is directed first through a low-pass mode filter, which eliminates all but the lower-order modes from the signal, and then through a mode scrambler, which redistributes energy from lower-order to strongly guided higher-order modes to achieve the desired mode distribution. Preferably, the mode filter comprises a gap between two fiber optic segments, while the scrambler comprises a high-curvature region such as created by wrapping the downstream segment around a mandrel.

The air gap establishes a uniform light excitation at the entrance to the second fiber in both the spatial and angular domains. This occurs with a gap between fibers of about 1 mm or more. An air gap produces a spatial overfilling of the receiving fiber due to the increase in beam waist over distance, while simultaneously causing a filtering of the higher angular modes. The air gap also tends to cause mixing of the modes in a fashion which would not occur normally in the fiber over a short distance. The combination of these three effects produces a uniform excitation at the second fiber. The mandrel wrap following the air gap serves to redistribute the light to the equilibrium condition. The mandrel wrap diameter and number of turns are chosen so as not to stress the fiber (i.e., consistently with FOTP-50).

DESCRIPTION OF THE PREFERRED EMBODIMENT

Figure 1:
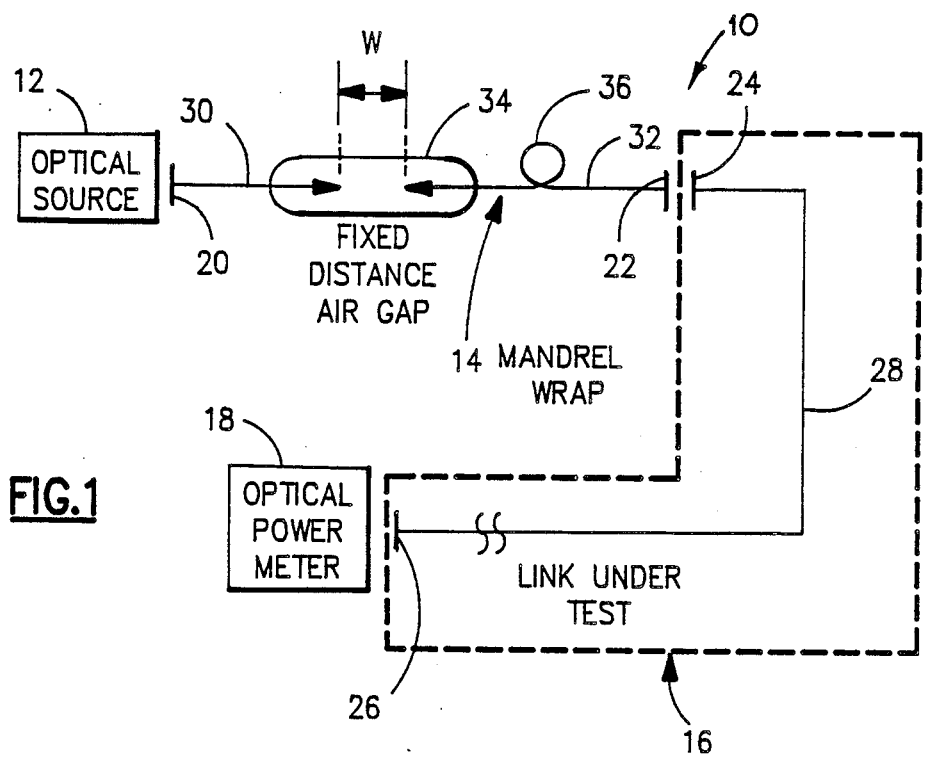
FIG. 1 is a schematic diagram of a fiber optic system incorporating the mode conditioner of the present invention.

Referring to FIG. 1, a fiber optic system 10 incorporating our mode conditioner includes a light source 12, preferably a light-emitting diode (LED), coupled to a multimode fiber optic link 16 under test through the mode conditioner 14 of the present invention. Link 16, which may be several kilometers in length, is coupled to an optical power meter 18 at the end remote from source 12 and mode conditioner 14. Respective connectors 20 and 22 of any suitable type known to the art couple mode conditioner 14 to the source 12 and link 16 under test. Link 16 under test comprises a fiber optic cable portion 28 which is coupled to connector 22 of mode conditioner 14 through a connector 24 and to the power meter 18 through a connector 26. Link 16 may also contain intermediate splices, which are not shown.

Figure 2:
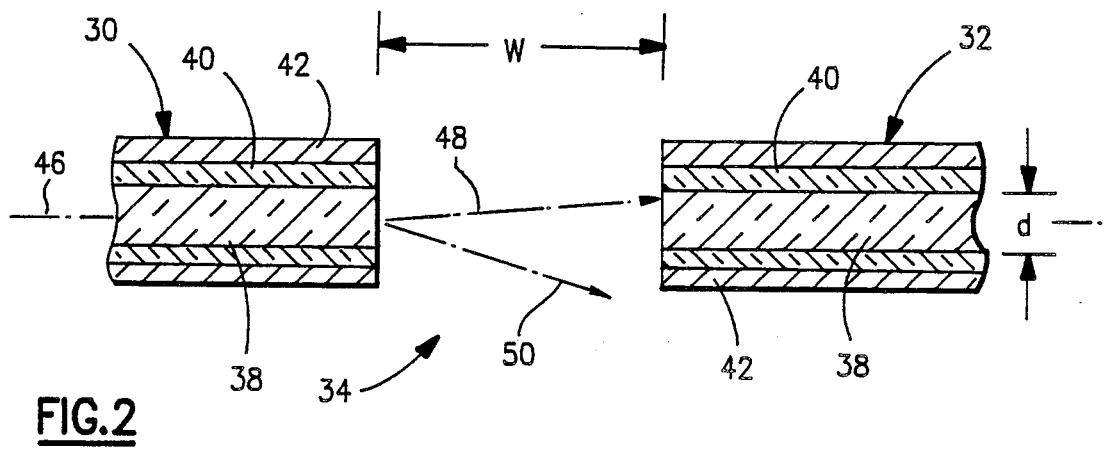
FIG. 2 is an enlarged fragmentary section of the air gap of the mode conditioner shown in FIG. 1.
Figure 3:
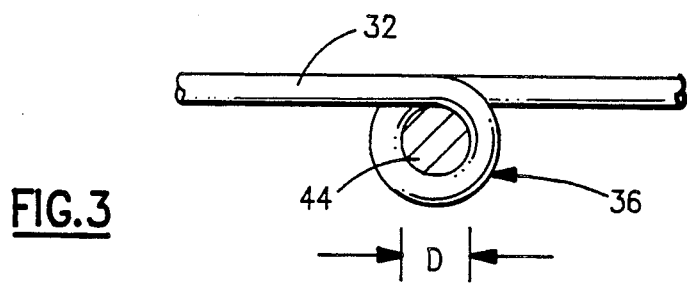
FIG. 3 is a fragmentary section, on a reduced scale from FIG. 2, showing the mandrel wrap of the mode conditioner shown in FIG. 1.

Referring now also to FIGS. 2 and 3, mode conditioner 14 comprises a first multimode fiber optic segment 30 coupled to connector 20 for attachment to source 12 and a second multimode fiber optic segment 32 coupled to connector 22 for attachment to the link 16 under test. As shown in FIG. 3, each of the fiber optic segments 30 and 32 comprises an inner core 38 of light-transmissive material of a given index of refraction, surrounded by a cladding 40 of light-transmissive material having an index of refraction lower than that of the core 38. Cladding 40 is in turn contained in a buffer layer 42. Preferably, core 38 and surrounding layers 40 and 42 are radically symmetric about an axis 46. Core 38 may have either a single index of refraction or, alternatively, an index of refraction that varies radially, specifically, decreasing monotonically outwardly from a maximum along the axis 46. Still other layers of material may surround the fiber element (core 38 and cladding 40) and buffer 42, but have not been shown in FIG. 3 since they are not material to the description of the present invention. The adjacent ends of segments 30 and 32 are separated to form a gap 34, the width W of which is substantially greater than the diameter d of the cores 38 of the segments 30 and 32. Thus a suitable gap width W for cores 38 having diameters of 50 or 62.5 microns would be 1,000 microns, or one millimeter. Although the gap 34 is preferably filled with air, it may also contain a vacuum or a filler material, in particular a material approximating the index of refraction of the cores 38. Since the propagation geometry is affected by the index of refraction of the gap medium, the optimum gap width will also vary accordingly.

The light signal (the term "signal" is used here without regard to whether the light is modulated to contain desired information) propagating along segment 30 from source 12 contains many modes (approximately 900), the higher-order modes propagating along paths forming a relatively large angle with the axis 46 and the lower-order modes propagating along paths forming relatively small angles with the axis 46. The gap 34 functions as a mode filter because only lower-order modes travel along paths forming a sufficiently low angle with the axis 46 to strike the core 38 of segment 32. Thus, as shown in FIG. 2, a lower-mode ray 48 impinges upon the surface of core 38 of receptor segment 32, entering the core 38 to propagate along segment 32. On the other hand, a higher-mode ray 50 misses core 38 of segment 32 altogether, and is thus effectively eliminated from the signal entering segment 32.

If the original light signal were simply filtered in this manner by air gap 34, the light signal carried by segment 32 would consist entirely of lower-order modes (principally the first ten modes), and would not contain the intermediate modes that form part of an equilibrium distribution. Accordingly, the light signal traversing segment 32 is directed through a mode scrambler comprising a mandral wrap 36. Mandral wrap 36 consists of a plurality of turns (preferably five turns) of the fiber optic segment 32 about a mandrel 44 to form a helix. Preferably mandrel 44 has a diameter of about 20 mm so as not to stress the segment 32 unduly. Mandral wrap 36 redistributes energy into strongly guided higher-order modes, with the result that light exiting segment 32 and entering link 16 has an equilibrium distribution containing, typically, the first 225 modes.

The losses measured for a connection from a 62.5-micron cable to a 50-micron cable using no source conditioning were compared with those measured using the technique of the present invention employing a mandrel wrap in combination with an air gap. A single fiber optic connector was measured using 16 different sources. The losses measured using the unconditioned source varied over a range of 3.4 dB, between a minimum of 1.7 dB and a maximum of 5.1 dB. On the other hand, the corresponding losses measured using the technique of the present invention varied over a range of less than 0.1 dB, between a minimum of about 3.1 dB and a maximum of about 3.2 dB.

Similar results have been obtained for other link configurations. The present invention reduces the variability in link loss measurements due to source conditions to acceptable amounts and, in all cases, the results have equaled or exceeded those of any of the devices identified in the background portion of the specification. The present invention, however, has the advantages of extreme simplicity and low cost over these alternative solutions.

While the invention has been particularly shown and described with reference to preferred embodiments thereof, it will be understood by those skilled in the art that various changes in form and details may be made therein without departing from the spirit and scope of the invention.

What is claimed is:

1. A fiber optic mode conditioner comprising first and second fiber optic segments, each of said segments containing a fiber optic core of predetermined transverse dimension and having a first end and a second end, at least a portion of said second segment having a path curvature, said segments being arranged serially with the second end of said second segment at a spacing therefrom substantially greater than the transverse dimension of said cores, and means for introducing light into said first segment from the first end thereof.

2. Apparatus as in claim 1 in which fiber optic cores are cylindrical cores having radially varying indices of refraction.

3. Apparatus as in claim 1 in which the spacing between said ends is at least about 1 millimeter.

4. Apparatus as in claim 1 in which said path curvature comprises a helix.

5. Apparatus as in claim 4 in which the diameter of said helix is not more than about 20 millimeters.

6. Apparatus as in claim 4 in which said helix comprises at least about 5 turns.

7. A method of conditioning the mode distribution of light in a fiber optic conductor comprising the steps of directing said light through a low-pass mode filter to eliminate the higher-order modes from said light and directing said mode-filtered light through a mode scrambler to redistribute the remaining modes of said mode-filtered light.

8. A method as in claim 7 in which said mode filter comprises a gap between adjacent fiber optic segments.

9. A method as in claim 8 in which the width of said gap is at least about 1 millimeter.

10. A method as in claim 7 in which said mode scrambler comprises a fiber optic portion, having a path curvature.

11. A method as in claim 10 in which said path, curvature comprises a helix.

12. A method as in claim 11 in which the inside diameter of said helix is not more than about 20 millimeters.

13. A method as in claim 11 in which said helix comprises at least about 5 turns.

14. Apparatus for conditioning the mode distribution of light in a fiber optic conductor comprising a low-pass mode filter for eliminating the higher-order modes from said light, a mode scrambler for redistributing the lower-order modes of said light into higher-order modes, and means for successively directing said light through said mode filter and said mode scrambler.

15. Apparatus as in claim 14 in which said mode filter comprises a gap between adjacent fiber optic segments.

16. Apparatus as in claim 15 in which the width of said gap is at least about 1 millimeter.

17. Apparatus as in claim 14 in which said mode scrambler comprises a fiber optic portion having a path curvature.

18. Apparatus as in claim 17 in which said path curvature comprises a helix.

19. Apparatus as in claim 18 in which the inside diameter of said helix is not more that about 20 millimeters.

20. Apparatus as in claim 18 in which said helix comprises at least about 5 turns.

* * * * *